(12) United States Patent
Brissette et al.

(10) Patent No.: US 6,454,656 B2
(45) Date of Patent: *Sep. 24, 2002

(54) YOKE CONNECTIONS FOR UNIVERSAL JOINTS

(75) Inventors: Ronald N. Brissette, Lake Orion; Gary J. Koslowski, Shelby Township; Craig Holt, Harrison Township, all of MI (US)

(73) Assignee: Meritor Heavy Vehicle Technology, LLC, Troy, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/970,286

(22) Filed: Oct. 2, 2001

Related U.S. Application Data

(63) Continuation of application No. 08/764,736, filed on Dec. 5, 1996, now Pat. No. 6,328,654, which is a continuation of application No. 08/414,529, filed on Mar. 31, 1995, now abandoned.

(51) Int. Cl.$^7$ ................................................. F16D 3/41
(52) U.S. Cl. ....................................... 464/130; 464/134
(58) Field of Search ............................... 464/128, 130, 464/132, 134, 135, 136, 901; 384/562; 29/898.07

(56) References Cited

U.S. PATENT DOCUMENTS

| | | | |
|---|---|---|---|
| 2,698,527 A | * | 1/1955 | Anderson .................... 464/130 |
| 4,768,995 A | * | 9/1988 | Mangiavacchi ............. 464/135 |
| 5,000,609 A | * | 3/1991 | Dutkiewicz et al. ..... 464/130 X |
| 5,376,051 A | * | 12/1994 | Valencic ...................... 464/130 |
| 6,328,654 B1 | * | 12/2001 | Brissette et al. ............ 464/136 |

FOREIGN PATENT DOCUMENTS

| GB | 705009 | * | 3/1954 |
|---|---|---|---|

* cited by examiner

*Primary Examiner*—Greg Binda
(74) *Attorney, Agent, or Firm*—Carlson, Gaskey & Olds

(57) ABSTRACT

A unique structure for connecting the cross member of a universal joint to two yokes includes at least a pair of wing bearings bolted to one of the yokes. Preferably, the other yoke utilizes full circular bores to receive the other two shafts of the cross member. The wing bearings include structure which ensures a secure connection to the yoke. In particular, a locator finger extends radially inwardly from the yoke and over the wing bearing and shaft. In this way, the distance between a reaction plane between the yoke and wing bearing and the centerline of the shaft within the wing bearing is reduced. This reduces a force moment on the shaft. In other features of this invention, the use of the full circular bore for one of the yokes allows the universal joint manufacturer to fully assemble the first yoke to the cross member, and ship that assembled yoke and cross member to the vehicle manufacturer. The vehicle manufacturer must only then assemble the yoke to its drive shaft, and bolt the two wing bearings to a second yoke. In this way, the vehicle manufacturer has no responsibility to properly lubricate the bearings in the universal joint. Thus, the bearings may be properly lubricated by the universal joint manufacturer, and should remain properly lubricated for the expected life of the universal joint.

13 Claims, 2 Drawing Sheets

YOKE CONNECTIONS FOR UNIVERSAL JOINTS

This application is a continuation of the application Ser. No. 08/764,736 filed on Dec. 5, 1996 now granted U.S. Pat. No. 6,328,654, which was a file wrapper continuation of application Ser. No. 08/414,529 filed Mar. 31, 1995, now abandoned.

BACKGROUND OF THE INVENTION

The present invention relates to universal joints and to connection assemblies between a yoke and the shafts of a universal joint cross member.

Modern vehicles are often equipped with universal joints that comprise a cross member having four shafts or trunnions. Bearings are mounted on each shaft, and two yokes are mounted onto opposed pairs of shafts. The yokes are mounted at positions spaced 90° relative to each other and are each connected to drive shafts. This arrangement allows rotation to be transmitted through varying angles between the drive shafts, through varying angles. This type of universal joint is particularly popular in heavy. duty vehicles such as trucks.

Universal joint assemblies experience a great deal of stress and vibration and are exposed to a hostile environment on the underside of a vehicle. Thus, the connection between the yoke and the bearings should be secure and stable. Proper functioning of a universal joint also requires adequate lubrication between the bearings and the shafts. The universal joint designs utilized in the past have not always achieved these goals for yoke and cross member connections.

Conventionally, universal joints have utilized yokes that have full circular or cylindrical bores to receive a bearing and shaft. The full circular bore surrounds and supports the bearing during operation of the universal joint. Typically, the two shafts on the cross member are inserted within the bores in the yoke. The bearings are then inserted radially inwardly through the outer end of the bore and onto the shafts.

One problem with this arrangement is that since the bearings are inserted through the bores in the yoke after insertion of the shafts, the universal joint manufacturer has been unable to finally mount the bearings on the cross member shafts. Rather, the bearings must be mounted on the shaft at the vehicle assembly line. Typically, the assemblers at the vehicle assembly line are not as skilled in proper lubrication or assembly of universal joint bearings as assemblers at the universal joint manufacturer. For that reason, there has sometimes been improper lubrication or assembly of universal joints assembled on the assembly line.

To address this problem, universal joints have been developed wherein the cross member may be preassembled with its bearings already attached. In one prior art universal joint, the cross member shaft and bearing lay in a half-circle bore in the yoke. Metal straps surround the bearing and are connected to the yoke with bolts. This prior art assembly requires tight dimensional control.

In another prior art design, the bearing is connected to the yoke with bolts. The mounting bolts in this universal joint connection may become loose due to the high force moments. With either type of assembly, small locators on the bearing may be used to transmit rotation between the bearing and yoke. The small locators are placed relatively far from the centerline of the shaft. The locator provides a good deal of the reaction surface for torque transmission, and the distance from the shaft centerline results in relatively high force moments.

SUMMARY OF THE INVENTION

In a disclosed embodiment of the present invention, wing bearings support two shafts of a cross member and are bolted to a yoke. The yoke includes two opposed brackets, each having two arms forming a part-circular surface to receive the wing bearing and cross member shaft. The arms extend around more than 90° of the bearing's outer periphery to provide a secure engagement between the yoke and bearing. The bearing includes a depression on an outer wall of the bearing cup. The yoke bracket includes a locator finger extending between the arms of the yoke bracket, and located in the bearing depression. Preferably, the fingers extend radially inwardly to overlay the needle bearings, and at least a portion of the shaft is received in the wing bearing. The extension places the finger relatively close to the center axis of the shaft, minimizing the moment.

In another feature of the invention, the wing bearing includes a shoulder projecting from the periphery of the bearing. A yoke receiving the bearing has a mating surface disposed between the bracket arms. The shoulder contacts the mating surface to provide a secure connection between the bearing and the yoke, and inhibit rotation of the bearing in the yoke. In a preferred embodiment, the yoke also includes a lip extending beyond the mating surface, and between the bracket arms to overlay a top portion of the shoulder.

The inventive universal joint preferably combines one yoke having the prior art full circular bore mounting two shafts and a second yoke utilizing the above-described wing bearings which are bolted to the yoke. The universal joint manufacturer may preassemble a yoke having full circular bores onto two of the shafts of the cross member with its associated bearings. In this way, the universal joint manufacturer is able to insure proper lubrication of those bearings. The universal joint manufacturer may then mount the wing bearings onto the other two shafts of the cross member. The yoke and assembled cross member may then be shipped to the vehicle manufacturer. When the vehicle manufacturer assembles the drive line of the vehicle, the assembler at the vehicle assembly line need only bolt the wing bearings to a second yoke. Thus, the benefits of the full circular bore are obtained for two of the shafts, and the benefits of utilizing a wing bearing are obtained for the other two shafts.

In a method of assembling a universal joint utilizing the present invention, the universal joint assembler mounts a conventional first yoke having full circular bores onto two of the shafts. Wing bearings are mounted on the other two shafts. That assembled yoke is then transported to the vehicle assembler. The vehicle assembler assembles the drive line to include the first yoke, and bolts the wing bearings onto a second yoke. In this way, the assembler at the vehicle assembly line is not required to provide any lubrication for the bearings.

With this inventive solution, applicant has developed universal joints that require no maintenance lubrication. By insuring the proper lubrication is provided at the initial assembly, no routine lubrication maintenance is required. Thus, once assembled, the universal joint will be permanently lubricated for its expected life.

These and other features of the present invention will be best understood from the following specification and drawings, of which the following is a brief description.

DETAILED DESCRIPTION OF A PREFERRED EMBODIMENT OF THE INVENTION

Figure 1:
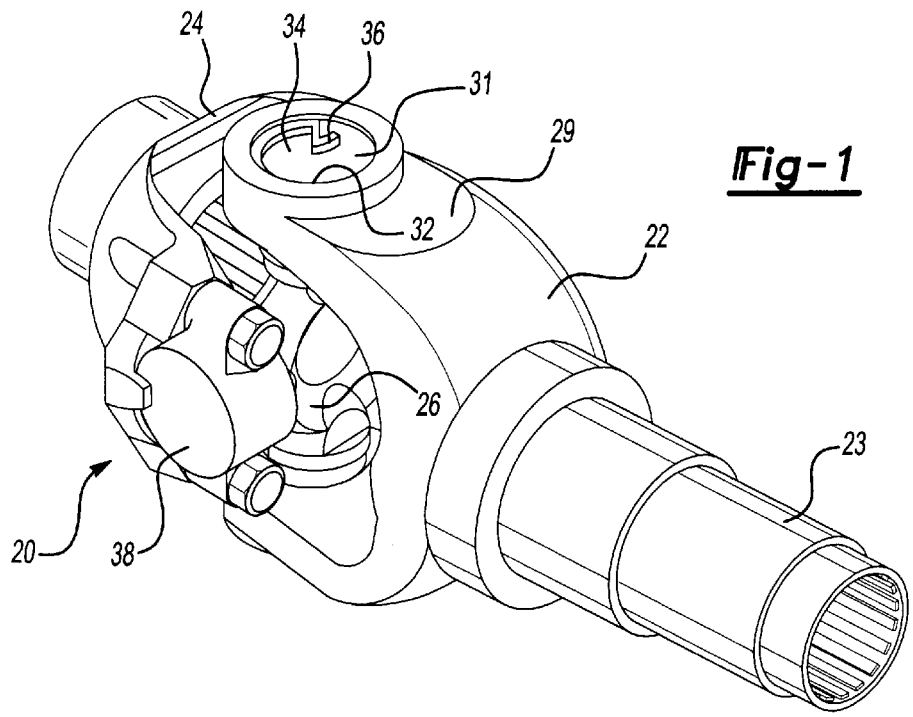
FIG. 1 is a perspective view of a universal joint in accordance with the present invention.

Universal joint 20 is illustrated in FIG. 1, and incorporates two yokes 22 and 24 and a cross member 26. Yokes 22 and 24 are each received on two opposing shafts of cross member 26.

Figure 2:
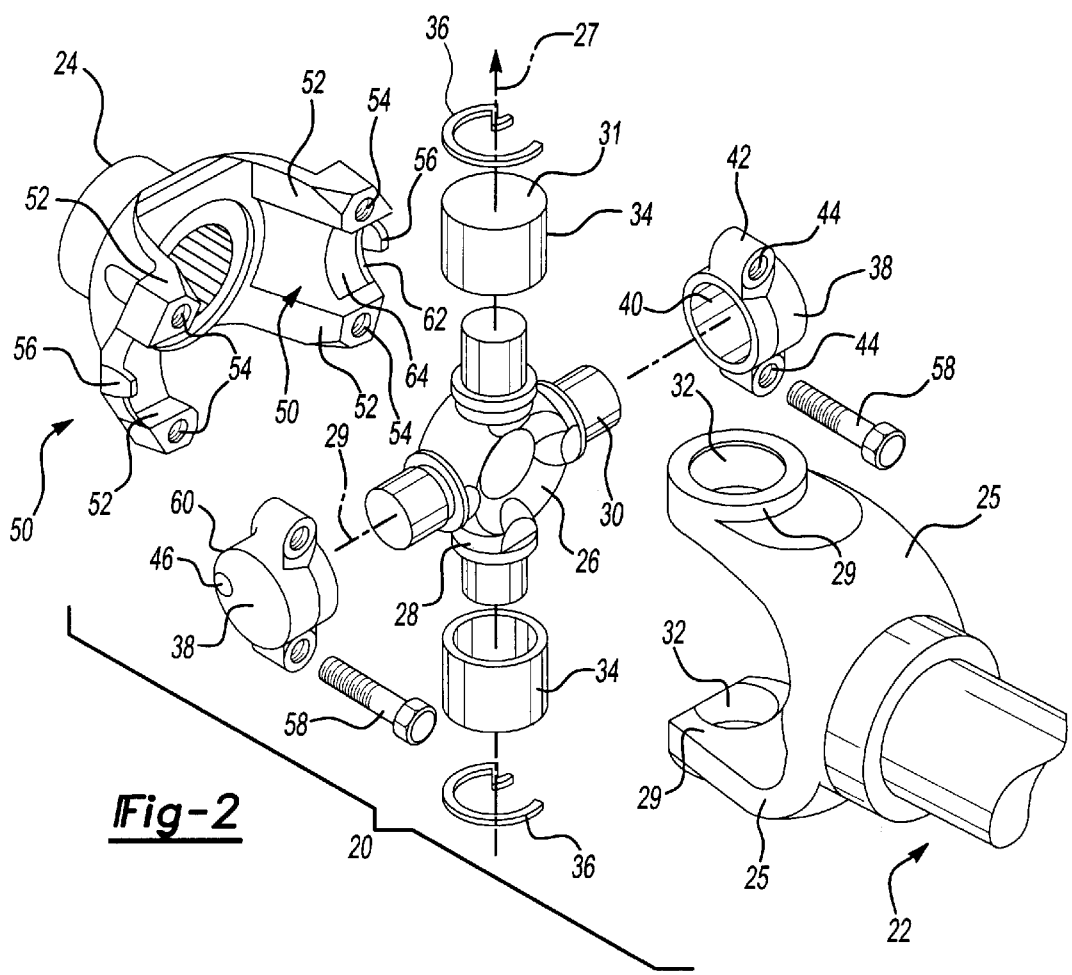
FIG. 2 is an exploded perspective view of the universal joint of FIG. 1.

The connection between yoke 22 and cross member 26 is conventional. As shown in FIG. 2, yoke 22 includes a pair of opposing arms 25 each having a bracket 29 defining a full circular bore 32. The method of connecting shafts 28 to yoke 22 includes inserting shafts 28 into bores 32. Bearings 34 are then mounted onto shafts 28 by inserting a receiving cup of bearing 34 radially inwardly into bores 32, and onto shafts 28. Rings 36 are then snapped over a face 31 of bearing 34 retaining bearing 34 in bore 32.

The connection between yoke 24 and cross member 26 utilizes wing bearings 38, as described further below. Although, the disclosed embodiment shows only one yoke utilizing wing bearings, it should be understood that some of the benefits disclosed in this application may apply to universal joints where both yokes use wing bearings. Yokes 22 and 24 are each connected to drive shafts 23.

Cross member 26 includes two pairs of shafts 28 and 30. The shafts in each pair are spaced 180° from the other as measured from central axis 29, 27. Shafts 28 are spaced 90° from shafts 30. A wing bearing 38 is mounted onto each shaft 30. Wing bearing 38 has a bearing receiving cup 40 and a pair of opposed wings 42, each having a bolt hole 44. Wing bearings 38 also include a depression 46 formed on an outer face. The term depression as applied and used in this application defines a surface on a different plane than that of the outer face.

Yoke 24 includes two opposed brackets 50 which each receive a wing bearing 38. Bracket 50 includes a pair of arms 52, which each include a threaded bore 54. A finger 56 extends between arms 52 of each bracket 50. A mating surface 62 is disposed between bracket arms 52 adjacent locator finger 56.

Figure 3:
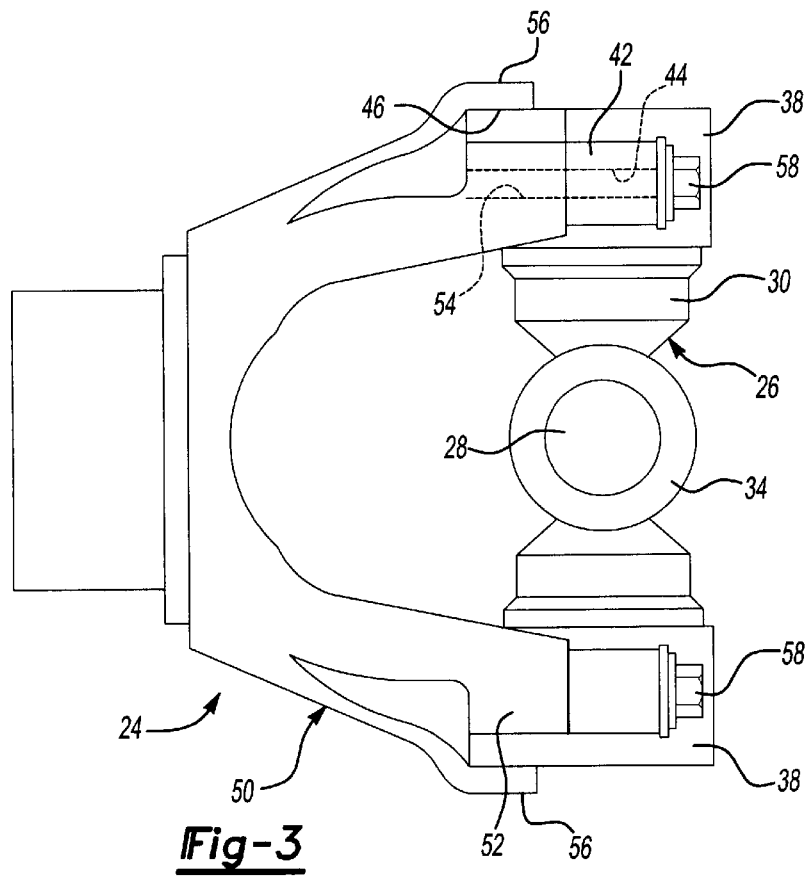
FIG. 3 is a side elevation view of connection between a yoke and cross member shafts in the universal joint of FIG. 1.

As shown in FIG. 3, bolts 58 pass through wing bearing bolt holes 44 and are threadably received in threaded bores 54 to secure wing bearing 38, and thus shaft 30 to yoke 24. Finger 56 of bracket 50 is received in depression 46 of wing bearing 38. During assembly of universal joint 20, finger 56 helps to properly locate wing bearing 38 in bracket 50 of yoke 24.

Finger 56 also provides a main contact surface to transmit forces between the yoke and bearing during rotation. That is, a main reaction plane of the forces between the yoke and bearing during rotation is defined at the finger 56. In prior art wing bearings, the reaction plane has been spaced radially outwardly from the nominal outer periphery of the needle bearing surfaces. As such, a relatively large force moment is created between that reaction plane and the centerline of the shaft. This is undesirable. With applicant's invention of finger 56 extending radially inwardly over the wing bearings 38, the force moment has been greatly reduced.

Figure 4:
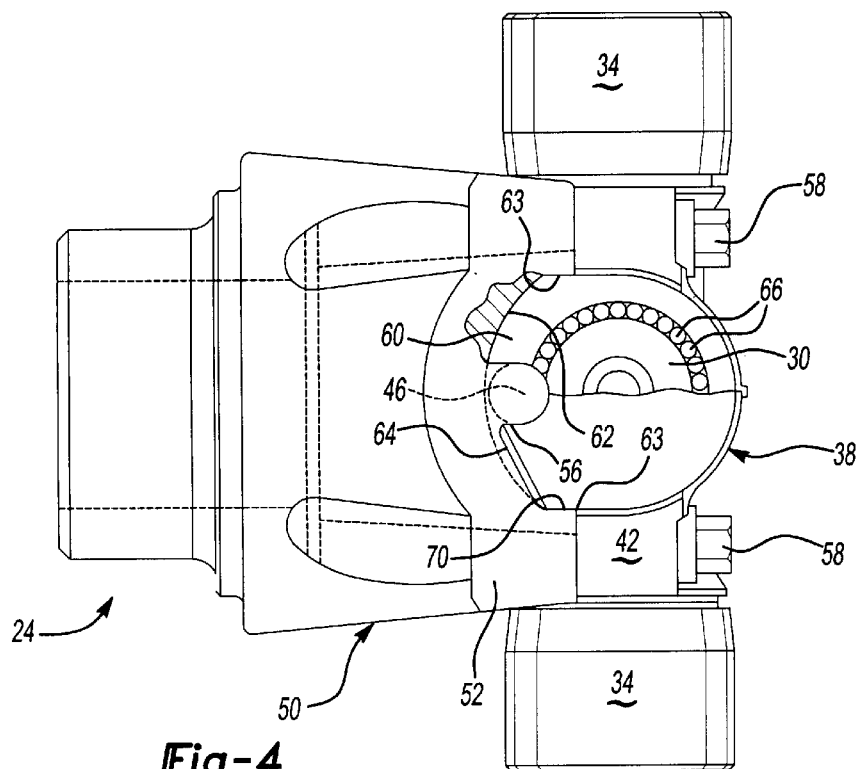
FIG. 4 is a top plan view of a connection between a yoke and cross member shafts in the universal joint of FIG. 1 with a portion cut away.

As shown in FIG. 4, bearing 38 includes a shoulder 60 which projects from a periphery and between wings 42. Shoulder 60 spans at least 45° around the periphery of wing bearing 38, as measured from the centerline of shaft 30. Preferably, shoulder 60 spans between 90° and 120° around the periphery of bearing 38. In one embodiment, shoulder 60 spans approximately 100° around the periphery of bearing 38. Bearing 38 is received between bracket arms 52, and shoulder 60 contacts mating surface 62 of bracket 50. Mating surface 62 helps align bearing 38 and also cooperates with mating surface 62 to prevent bearing 38 from rotating in bracket 50, thereby reducing forces which tend to loosen the bolts 58.

Bracket arms 52 extend forward of bracket 50 and at least partially surround shafts 30 to provide additional stability. The distance between arms 52 and the centerline of shaft 30 is significantly reduced. Preferably, ends 63 of arms 52 are spaced by at least 90° measured about the periphery of shaft 30. Thus, the arms 52 surround wing bearing 38, providing a secure connection.

Lip 64 extends between bracket arms 52 and outwardly of mating surface 62 to overlay a top portion of shoulder 60 of wing bearing 38. Lips 64 of opposed brackets 50 provide additional vibrational stability to the universal joint 20 by constraining wing bearings 38.

Finger 56 extends into depression 46, which extends over needle bearings 66, and at least a portion of shaft 30 to provide additional stability as described above. By extending over needle bearings 66 and at least a portion of shaft 30, finger 56 reduces the distance between the reaction plane and the centerline of shaft 30 and finger 56.

There are mating surfaces shown at 70 between the bearing and the yoke. Those mating surfaces 70 and the finger 56 and depression 46 are the only machined surfaces. The bearings and yokes are otherwise as forged or cast. Surfaces 70 provide additional guidance.

In a method of assembling a universal joint according to the present invention, a cross member 26 is initially inserted into a yoke 25 that has full circular bores 32. Bearings 34 are then moved inwardly through the bore 32 to secure the cross member 26 within yoke 25. Rings 36 are then driven inwardly through the bore 32 to secure bearings 34 within their respective bores 32.

Wing bearings 38 are mounted on the shafts 30 of cross member 26. The assembled yoke 25 and cross member 26 may then be shipped. At a vehicle assembly line, vehicle assemblers need only bolt the wing bearings 38 to the second yoke 24. The vehicle assembler need not remove any bearing from the cross member, and further must only bolt one set of bearings to a yoke. The yoke 25 utilizes the prior art full circular bores 32, which provide a very secure and desirable connection. At the same time, since the assembler need not add any bearings onto the shafts 28 or 30, the vehicle assembler is not involved in the lubrication of the universal joint bearing. For that reason, the universal joint manufacturer may insure proper lubrication of the bearing, and may lubricate the bearing such that maintenance and routine further lubrication of the universal joint should not be necessary during the expected life of the universal joint. This is a valuable benefit.

A preferred description of this invention has been disclosed; however, a worker of ordinary skill in the art would recognize that certain modifications would come within the scope of this invention. For that reason, the following claims should be studied to determine the true scope and content of this invention.

We claim:

1. A universal joint comprising:

a cross member having a first and second pair of shafts;

a first yoke connected to said first pair of shafts;

a second yoke having two opposed brackets, each bracket having two arms defining a bore and a locator finger disposed between said arms and formed integrally to said brackets;

two bearings each including a hollow cup, two opposed wings each having a securement member hole and a surface disposed on a different plane than an outer face of each said bearing; and said second pair of shafts each received in one of said cups, said bearings connected to said brackets with securement members passing through said hole and received in said bore, and wherein said finger extends over said bearing, and said finger received on said surface and wherein said integrally formed locator finger transmits rotation from said second yoke directly to said wings of said bearings.

2. The universal joint as recited in claim 1, wherein said second yoke includes a mating surface disposed between said arms, and said bearing includes a shoulder projection from a periphery of said bearing between said wings, wherein said shoulder contacts said mating surface to inhibit movement of said bearing in said bracket.

3. The universal joint as recited in claim 2, wherein said shoulder and said mating surface are arcuate, and wherein ends of said arms are spaced from each other by at least 90° measured from a central axis of said first and second pairs of shafts.

4. The universal joint as recited in claim 3, wherein said finger extends radially inwardly over at least a portion of said first and second pairs of shafts.

5. The universal joint as recited in claim 4, wherein said second yoke includes a lip extending outwardly of said mating surface, and between said arms to overlay a top portion of said shoulder.

6. The universal joint as recited in claim 2, wherein said finger extends radially inwardly over at least a portion of said first and second pairs of shafts.

7. The universal joint as recited in claim 2, wherein said second yoke includes a lip extending outwardly of said mating surface and between said arms to overlay a top portion of said shoulder.

8. The universal joint as recited in claim 1, wherein said finger extends radially inwardly over needle bearings received within said cup.

9. The universal joint as recited in claim 8, wherein said finger extends radially inwardly over at least a portion of said first and second pairs of shafts.

10. A universal joint comprising:

a first universal joint subassembly comprising a cross member having a first and second pair of shafts;

said first universal joint subassembly further comprising a first yoke having two opposing brackets with fully enclosed bores surrounded by said brackets over 360°;

a second universal joint subassembly comprising a second yoke having two opposing brackets, each bracket having two arms extending from said bracket to define a bearing surface therebetween, each arm having a securement member bore, and a mating surface disposed between said arms;

said first universal joint subassembly further comprising two wing bearings each including a cup, and two opposed wings with a securement member hole;

said first universal joint subassembly further comprising two shaft bearings, each having a cup;

said first pair of shafts received in said cups of said shaft bearings, said shaft bearings disposed in said fully enclosed bores of said first yoke, said second pair of shafts received in said cups of said wing bearings to form said first universal joint subassembly, said wing bearings connected to said second yoke brackets with securement members each passing through a respective securement member hole and received in a respective securement member bore to connect said first universal joint subassembly to said second universal joint subassembly; and said wing bearing cups being closed at an outer surface, and a locator finger from said yokes being received on a surface disposed on a different plane than said outer surface, wherein said second yoke further includes said locator finger disposed between said arms, and said wing bearings include said surface on said outer surface of each of said wing bearings, and wherein said finger extends onto said surface on a different plane than said outer surface.

11. The universal joint as recited in claim 10, wherein said finger extends radially inwardly over said wing bearings and at least a portion of said first and second pairs of shafts.

12. The universal joint as recited in claim 11, wherein said second yoke includes a lip which extends outwardly from between said arms, overlying a top portion of said wing bearing.

13. The universal joint as recited in claim 11, Wherein said second yoke includes a lip which extends outwardly from between said arms, overlying a top portion of each one of said wing bearings.

* * * * *

Disclaimer 6,454,656—Ronald N. Brissette, Lake Orion; Gary J. Koslowski, Shelby Township; Craig Holt, Harrison Township, all of MI. YOKE CONNECTIONS FOR UNIVERSAL JOINTS. Patent dated September 24, 2002. Disclaimer filed May 14, 2002, by assignee, Meritor Heavy Vehicle Technology, LLC.

The term of this patent shall not extend beyond the expiration date of Pat. No. 6,328,654.
*(Official Gazette, June 10, 2003)*